United States Patent
Kjeldaas et al.

(10) Patent No.: US 9,210,058 B2
(45) Date of Patent: Dec. 8, 2015

(54) SYSTEMS AND METHODS FOR ASSESSING JITTER BUFFERS

(71) Applicant: GOOGLE INC., Mountain View, CA (US)

(72) Inventors: Alexander Kjeldaas, Saltsjö-Boo (SE); Serge Lachapelle, Vallentuna (SE)

(73) Assignee: GOOGLE INC., Mountain View, CA (US)

(*) Notice: Subject to any disclaimer, the term of this patent is extended or adjusted under 35 U.S.C. 154(b) by 237 days.

(21) Appl. No.: 13/791,878

(22) Filed: Mar. 8, 2013

(65) Prior Publication Data

US 2014/0078916 A1   Mar. 20, 2014

Related U.S. Application Data

(60) Provisional application No. 61/701,553, filed on Sep. 14, 2012.

(51) Int. Cl.

| | |
|---|---|
| *H04L 12/28* | (2006.01) |
| *H04L 12/26* | (2006.01) |
| *H04L 12/24* | (2006.01) |
| *H04L 29/06* | (2006.01) |
| *H04L 12/841* | (2013.01) |
| *H04J 3/06* | (2006.01) |
| *H04L 12/825* | (2013.01) |
| *H04J 1/16* | (2006.01) |

(52) U.S. Cl.
CPC ............. *H04L 43/087* (2013.01); *H04J 3/0632* (2013.01); *H04L 41/5038* (2013.01); *H04L 43/16* (2013.01); *H04L 47/25* (2013.01); *H04L 47/283* (2013.01); *H04L 65/1083* (2013.01); *H04L 65/80* (2013.01)

(58) Field of Classification Search
USPC ................................ 370/252, 278, 412, 442
See application file for complete search history.

(56) References Cited

U.S. PATENT DOCUMENTS

| | | | |
|---|---|---|---|
| 7,756,036 B2 * | 7/2010 | Druke et al. ................... 370/235 |
| 2005/0180323 A1 * | 8/2005 | Beightol et al. ............... 370/230 |
| 2010/0027567 A1 * | 2/2010 | Teramoto ....................... 370/516 |

* cited by examiner

*Primary Examiner* — John Pezzlo

(74) *Attorney, Agent, or Firm* — Morgan, Lewis & Bockius LLP

(57) ABSTRACT

A system having one or more processors and a memory, sends a plurality of test audio packets at a level of signal complexity deviating from a model level of signal complexity to a destination device through one or more networks. The system then receives a response to the plurality of test audio packets, where the response is indicative of a value for a quality of service characteristic associated with the one or more networks, and where the value for the quality of service characteristic is determined by how the plurality of test audio packets deviate from the model level of signal complexity when received by a remote device. In response to receiving the response to the plurality of test audio packets, the system activates a signal correction action when the value for the quality of service characteristic fails to meet a performance threshold.

19 Claims, 7 Drawing Sheets

700

Discovering jitter buffers with data packets transmitted with constant delays

Discovering jitter buffers with various sizes of packet trains and delays therebetween Discovering jitter buffers with packet delay variations

SYSTEMS AND METHODS FOR ASSESSING JITTER BUFFERS

RELATED APPLICATIONS

This application claims priority to U.S. Provisional Patent Application No. 61/701,553, filed Sep. 14, 2012, which is hereby incorporated by reference in its entirety.

TECHNICAL FIELD

The disclosed embodiments relate generally to communication systems, and in particular, to methods and systems for assessing jitter characteristics of a communication system in order to optimize quality of service characteristics associated with the communication system.

BACKGROUND

Nowadays, communications spanning across multiple networks commonly occur. For example, via VOIP and PSTN networks, a computer user can initiate a voice call to, and communicate with a telephone user. A communication path, connecting two or more users across several networks, is sometimes established and maintained during a communication. Along the communication path, jitter buffers are often employed to maintain or improve the quality of communication.

Jitter buffers, however, can overflow or underflow, resulting in communication quality deterioration. In the case of an overflow, data packets arrive at a jitter buffer that is fully occupied and are dropped, resulting in unnecessary data loss. In the case of an underflow, data packets that are necessary to maintain a steady data flow are withheld from further transmission in the jitter buffer resulting in "broken" communication. It is therefore desirable to determine jitter buffer capacity within communication networks, especially along a communication path. However, jitter buffer capacity is difficult to predict because communication paths, especially those involving PSTN networks, are often constructed on the fly. Also, due to the fact that a communication path may span several networks, some of which have different owners, it is simply not possible to directly determine jitter buffer capacity across the entire communication path. Despite these difficulties, users still expect their communication with other users to be smooth and effective.

Given the above background, what is needed are methods for determining quality of service, including jitter, across communication networks used to host a communication path.

SUMMARY

The problems with conventional approaches to maintain communication quality with jitter buffers described above are reduced or eliminated by the disclosed systems and methods described below.

In many situations it is advantageous to provide systems and methods that discover and assess jitter buffers within one or more networks, through which users communicate, and take corrective actions, if desired, to maintain or improve the quality of communication within the networks. In particular, an approach—that sends test audio packets through one or more networks, receives a response indicative of quality of service characteristic of the networks, and then selectively activates a signal correction action—can increase the effectiveness of jitter buffers implemented in communication networks, without the attendant cost of jitter buffer overflow or underflow.

In some embodiments, a method is performed at a device having one or more processors and memory storing one or more programs for execution by the one or more processors so as to perform the method. The method includes sending a plurality of test audio packets at a level of signal complexity deviating from a model level of signal complexity to a destination device through one or more networks, and receiving a response to the plurality of test audio packets. The response is indicative of a value for a quality of service characteristic associated with the one or more networks, and the value for the quality of service characteristic is determined by how the plurality of test audio packets deviate from the model level of signal complexity when received by a remote device. The method further includes, responsive to receiving the response to the plurality of test audio packets, activating a signal correction action when the value for the quality of service characteristic fails to meet a performance threshold.

In accordance with some embodiments, a computer system (e.g., a client system or server system) includes one or more processors, memory, and one or more programs. The one or more programs are stored in memory and are configured to be executed by the one or more processors. The one or more programs include instructions for performing the operations of the method described above. In accordance with some embodiments, a non-transitory computer readable storage medium has stored therein instructions which, when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

It will be understood that, although the terms "first," "second," etc. may be used herein to describe various elements, these elements should not be limited by these terms. These terms are only used to distinguish one element from another. For example, a first data packet could be termed a second data packet, and, similarly, a second data packet could be termed a first data packet, without changing the meaning of the description, so long as all occurrences of the "first data packet" are renamed consistently and all occurrences of the "second data packet" are renamed consistently. The first data packet and the second data packet are both data packets, but they are not the same data packet.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system, and corresponding methods of discovering and assessing jitter buffers, where a plurality of testing audio packets is sent through one or more networks, and a signal correction action is selectively activated in response to receiving a response to the plurality of test audio packets, so as to maintain and/or improve quality of service in the one or more networks.

Figure 1:
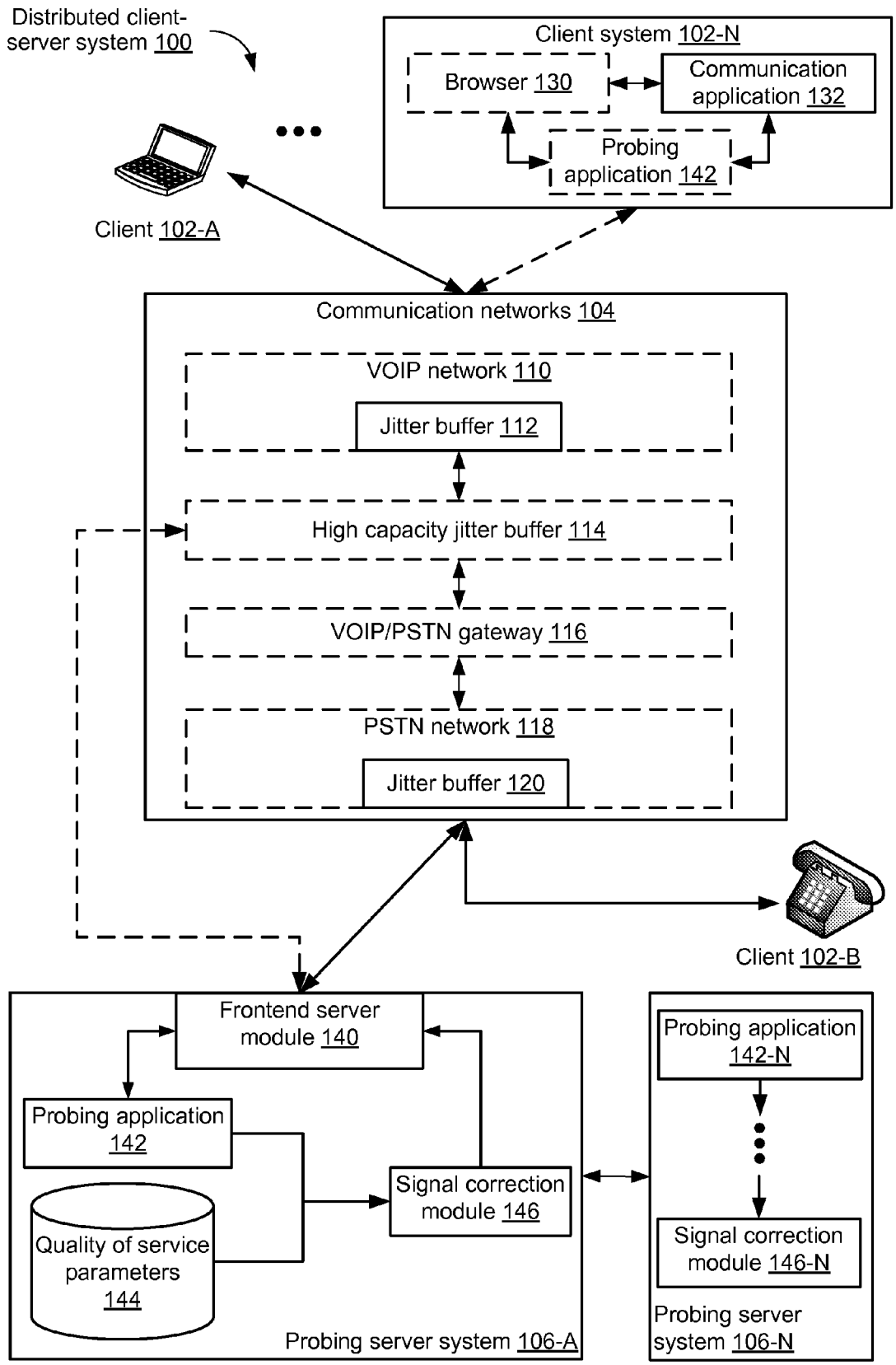
FIG. 1 is a block diagram illustrating a distributed client-server system, in accordance with some embodiments.

FIG. 1 includes a block diagram illustrating a Distributed Client-Server System 100 for discovering and assessing jitter buffers. Distributed Client-Server System 100 includes one or more Client System(s) 102 (a representative of which is referred to herein as "Client 102"), one or more Probing server system(s) 106-A . . . 106-N (a representative of which is referred to herein as "Probing server 106"), and Communication networks 104 for connecting Client 102 with other Clients 102, and with Probing Server(s) 106. Communication networks 104 optionally include the Internet, one or more local area networks (LANs), one or more wide area networks (WANs), PSTN network, VOIP network, other types of networks, or a combination of such networks.

In some embodiments, Client 102 includes Browser 130 (optionally) and Communication application 132. In some embodiments, Browser 130 includes a general purpose Internet browser (sometimes called a Web browser) having a browser window used for communication—audio and/or video communication—with other users via Communication networks 104. A web application user interface is optionally implemented using hypertext markup language (HTML) or extensible markup language (XML) elements that are rendered by Browser 130. Alternatively, a user communicates with other users via standalone Communication application 132. In some embodiments, Client 102 receives information concerning jitter buffers from Probing application 142, which resides in Probing server 106 (e.g., a thin client). In other embodiments, Client 102 includes Probing application 142 and/or Signal correction module 146 (e.g., a thick client). In some embodiments, Probing application 142 and/or Signal correction module 146 are software (e.g., program packages) downloaded from Probing Server 106 to Client 102, before or during a user communication. In other embodiments, Probing application 142 and/or Signal correction module 146 are hardware (e.g., IC chips) embedded in Client 102. Probing application 142 and/or Signal correction module 146 are described in more detail below.

In some embodiments, Client 102 communicates, via Communication networks 104, with one other Client 102 (e.g., a one-on-one phone conversation). In some embodiments, Client 102 communicates with two or more other Clients 102, at the same time (e.g., an audio/video conference). In some embodiments, Client 102-A is a computer, and Client 102-B, with which Client 102-A communicates, is a telephone (landline or mobile phone).

In some embodiments, once a communication is initiated by one Client 102 with another Client 102, communication data (e.g., one or more data packets) is transmitted, via Communication networks 104, to the other Clients 102. In some embodiments, Communication networks 104 include VOIP network 110. In some embodiments, VOIP network 110 optionally includes a packet-based network (such as the Internet), which transmits communication information, and related meta-data in data packets. In some embodiments, VOIP network 110 includes Jitter buffer 112, which places data packets or packet trains (e.g., data packets received at or around the same time) in a buffer queue (e.g., Buffer queue 214 in FIG. 2), and outputs data packets with constant or various delays.

In some embodiments, Communication networks 104 optionally include High-capacity jitter buffer 114. In some embodiments, High-capacity jitter buffer 114 buffers incoming data packets and output them in accordance with a set of predefined performance criteria, in order to provide a steady data flow (or a continuous playout of audio or video communication) between Clients 102.

In some embodiments, Communication networks 104 optionally include VOIP/PSTN gateway 116, which connects VOIP network 110 with PSTN network 118 (directly or indirectly), by transforming communication data received from VOIP network 110 into a format compatible with PSTN network 118, and vice versa. In some embodiments, Communication networks 104 optionally include PSTN network 118 (also called Public Switched Telephone Network) which includes telephone lines, fiber optic cables, microwave transmission links, cellular network, communication satellite, and undersea telephone cables, interconnected by switching centers. In some embodiments, PSTN network 118 also includes Jitter buffer 120, which buffers incoming data and output them with constant or various delays.

In some embodiments, VOIP network 110 and PSTN network 118 are owned and/or operated by different service providers (e.g., VOIP network 110 is owned/operated by an internet service provider, such as Google, while PSTN network 118 is owned/operated by a telephone service provider, such as AT&T). In many situations, technical configurations concerning these networks, such as jitter buffer capacity within a respective network, are not shared among these service providers. For example, the service provider that operates VOIP network 110 has no access to information concerning the jitter buffer capacity in PSTN network 118. Discovering and assessing jitter buffer in these situations is thus crucial, because it reveals network performance based on which corrective actions can be taken to maintain or improve communication quality.

In some embodiments, Probing server 106 includes Frontend server module 140, Probing application 142, Quality of service parameters 144, and Signal correction module 146. In some embodiments, Frontend server module 140 sends test audio packets received from Probing application 142, to one or more Clients 102, via Communication networks 104, and then receives a response from Clients 102. Frontend server module 140 also relays signal correction actions received from Signal correction module 146 to Clients 102 and/or components within Communication network 104, such as High capacity jitter buffer 114. In some embodiments, Probing application 142 generates test audio packets and sends them to Frontend server module 140 for further transmission. In some embodiments, Probing application 142 transmits the response to test audio packets, along with one or more Quality of service parameters 144, to Signal correction module 146. In some embodiments, Quality of service parameters includes quality of service information, packet delay variation information, signal complexity information, jitter mitigation information, and/or information concerning High capacity jitter buffer 114. In some embodiments, Signal correction module 146, in accordance with the response to audio test packets and/or information from Quality of service parameters 144, selectively activates a signal correction action—e.g., activating High capacity jitter buffer 114 within Communication networks 104—when a quality of service characteristic associated with Communication networks 104 fails a predefined performance threshold (e.g., the jitter associated with a communication between Client 102-A and Client 102-B exceeds a predefined threshold amount).

In some embodiments, where there are multiple server systems (e.g., Probing Server 106-A . . . Probing Server 106-N), different test audio packets are sent by two or more Probing servers 106, in parallel or in series, to assess jitter buffer capacity. In some embodiments, test audio packets are sent by two or more Probing servers 106, along different communication paths between Clients 102, so that an optimal communication path can be selected or switched to. In some embodiments, Signal correction modules 146 (e.g., Signal correction modules 146-A . . . Signal correction modules 146-N), within the multiple server systems, communicate with each other to coordinate activating signal correction actions. In some embodiments, in response to the same response to test audio packets, two or more signal correction actions are activated, in parallel or in series, by the same or separate Signal correction modules 146.

In some embodiments, signal correction actions by the same or separate Signal correction modules 146 are complementary of each other. For example, a signal to change a codec is activated (by Signal correction module 146-A) in addition to a signal to disable voice detection activity (activated by Signal correction module 146-N). In some embodiments, complementary signal correction actions are directed at different networking components within Communication networks 104. For example, the signal to change a codec is directed at Jitter buffer 112 within VOIP network 110, while the signal to disable voice detection activity is directed at Jitter buffer 120 within PSTN network 118.

In other embodiments, signal correction actions by separate Signal correction modules 146 are alternative of each other. For example, a signal to change a codec (activated by Signal correction module 146) is activated as an alternative to a signal to apply an error correction (activated by Signal correction module 146-N). In some embodiments, when two or more alternative signal correction actions are activated, Communication networks 104 determines which signal correction action to adopt, in accordance with a predefined set of performance criteria (e.g., adopting a signal correction action that potentially provides the best communication quality).

Figure 2:
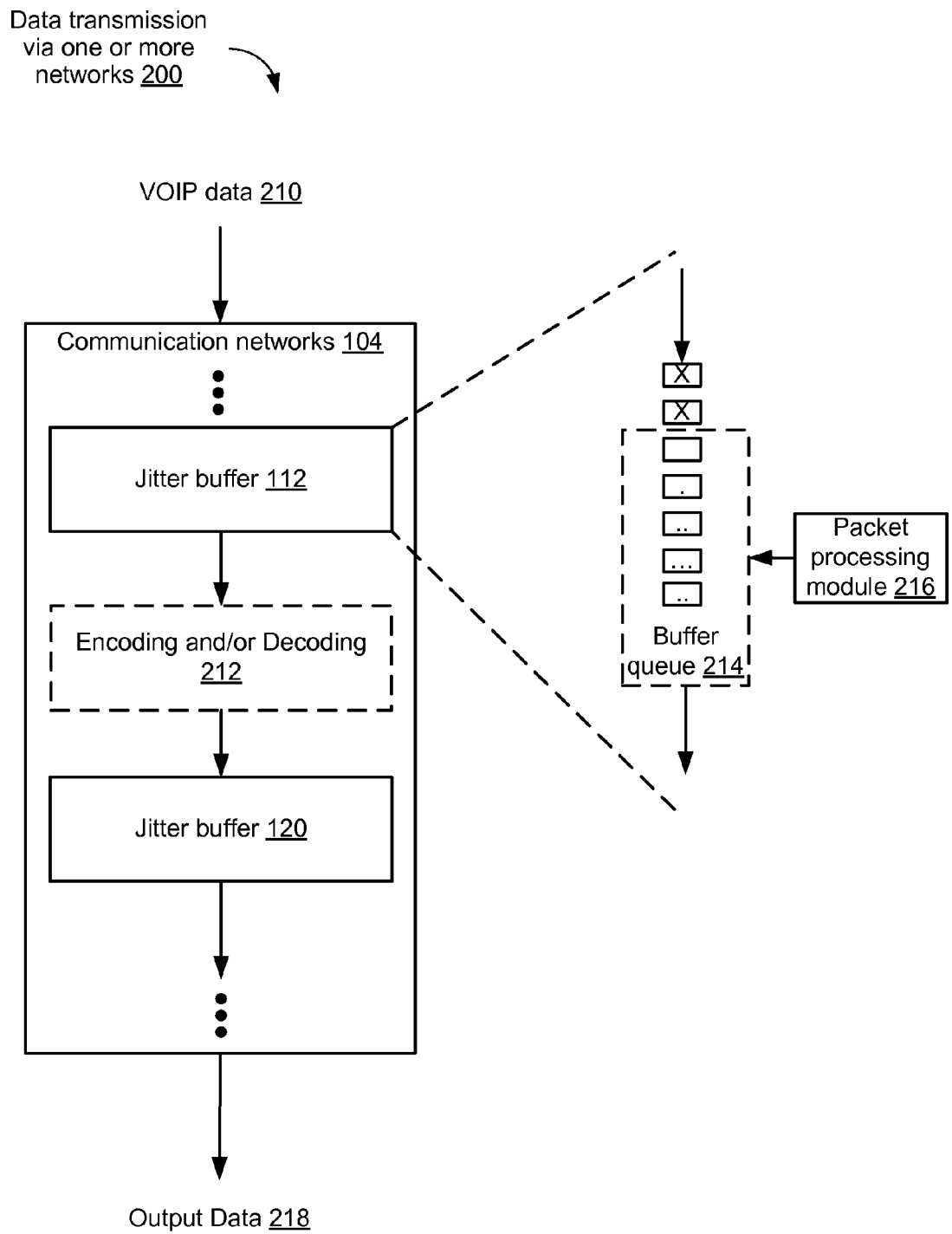
FIG. 2 is a block diagram illustrating an example of transmitting data through one or more networks, in accordance with some embodiments.

FIG. 2 is a block diagram illustrating an example of transmitting data through one or more networks, in accordance with some embodiments. As shown in FIG. 2, VOIP data 210 is transmitted through Communication networks 104. In some embodiments, VOIP data 210 includes data packets and/or packet trains. In some embodiments, Communication networks 104 include VOIP network 110 and PSTN network 118 (Not shown in FIG. 2). In some embodiments, VOIP data 210, after entering Communication networks 104, arrives at Jitter buffer 112. In some embodiments, Jitter buffer 112 includes one or more individual jitter buffers. In some embodiments, at Jitter buffer 112, data packets representing VOIP data 210 are placed in an input-output queue (e.g., Buffer queue 214). In some embodiments, data packets arrived when the queue is full are dropped (marked with "X"). In some embodiments, data packets in the queue are outputted (e.g., by Packet processing module 216) with constant or various delays between the packets. In some embodiments, at least a portion of the delays between data packets are added by Packet processing module 216. In some embodiments, Communication networks 104 optionally include data encoding and/or decoding module, such as Encoding and/or Decoding 212. After being encoded or decoded, data packets are further transmitted through one or more other jitter buffers (e.g., Jitter buffer 120), before they are delivered to Client(s) 102. In some embodiments, Jitter buffer 120 includes a different type of jitter buffer than those included in Jitter buffer 112. In some embodiments, Jitter buffer 120 removes a portion of the delays added to data packets by Jitter buffer 112. In other embodiments, Jitter buffer 120 removes at least a portion of the delays added by Jitter buffer 112. In other embodiments, Jitter buffer 120 optionally speeds out the output of incoming data packets in an overflow situation, and output "smart" or "dummy" data (discussed in more detail below) in an underflow situation.

Figure 3:
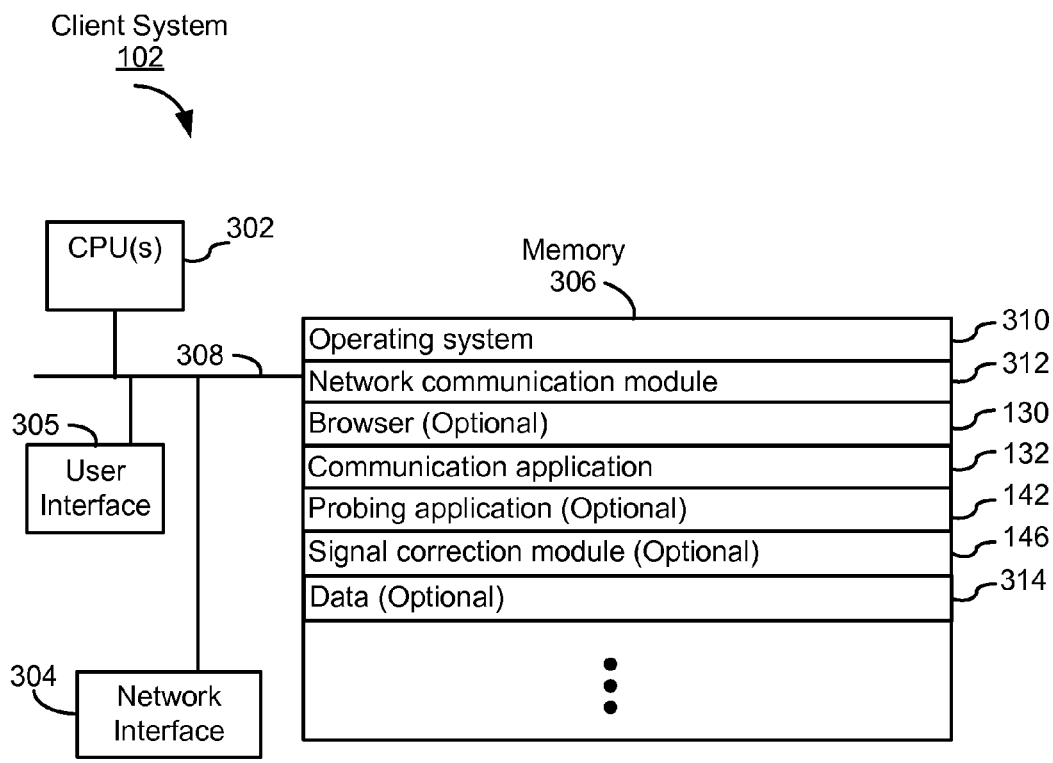
FIG. 3 is a block diagram illustrating a client system, in accordance with some embodiments.

FIG. 3 is a block diagram illustrating Client System 102 (also referred to herein as "Client 102") in accordance with some embodiments. Client 102 typically includes one or more processing units CPU(s) 302 (also herein referred to as processors), one or more network or other Communication Interfaces 304, Memory 306, User Interface 305 comprising a display device and a keyboard, mouse, touchpad, touchscreen or other input device, and one or more Communication Buses 308 for interconnecting these components. Communication Buses 308 optionally include circuitry (sometimes called a chipset) that interconnects and controls communications between system components. Memory 306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- Operating system 310 that includes procedures for handling various basic system services and for performing hardware dependent tasks;
- Network communication module (or instructions) 312 for connecting Client 102 to other devices (e.g., Probing servers 140 or other Clients 102) via Network Interfaces 204 (wired or wireless) and one or more networks (e.g., Communication networks 104), such as the Internet, other wide area networks, local area networks, metropolitan area networks, VOIP network, PSTN network, and so on;
- optionally, Browser 130 for loading web pages, which includes code for executing or interpreting Communication application 132 and/or Probing application 142 as application web page(s);
- Communication application 132 (e.g., a stand-alone communication client) for sending and receiving communication data (audio and/or video data) and related metadata, between Clients 102;
- optionally, Probing application 142, implemented in software or hardware, for discovering and assessing jitter buffers along a communication path between Clients, by sending test audio and/or video packets along the communication path, and receiving and analyzing response to the test audio packets;
- optionally, Signal correction module 146 for activating one or more signal correction actions in accordance with the response to test audio packets, and/or Quality of service parameters 144; and
- optionally, Data 314 for including cached data (e.g., recently received response to test audio packets, quality of service information concerning communications between Clients 102, or data awaiting transmission to other Clients 102, etc.).

In some implementations, one or more of the above identified elements are stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 may store additional modules and data structures not described above.

Figure 4:
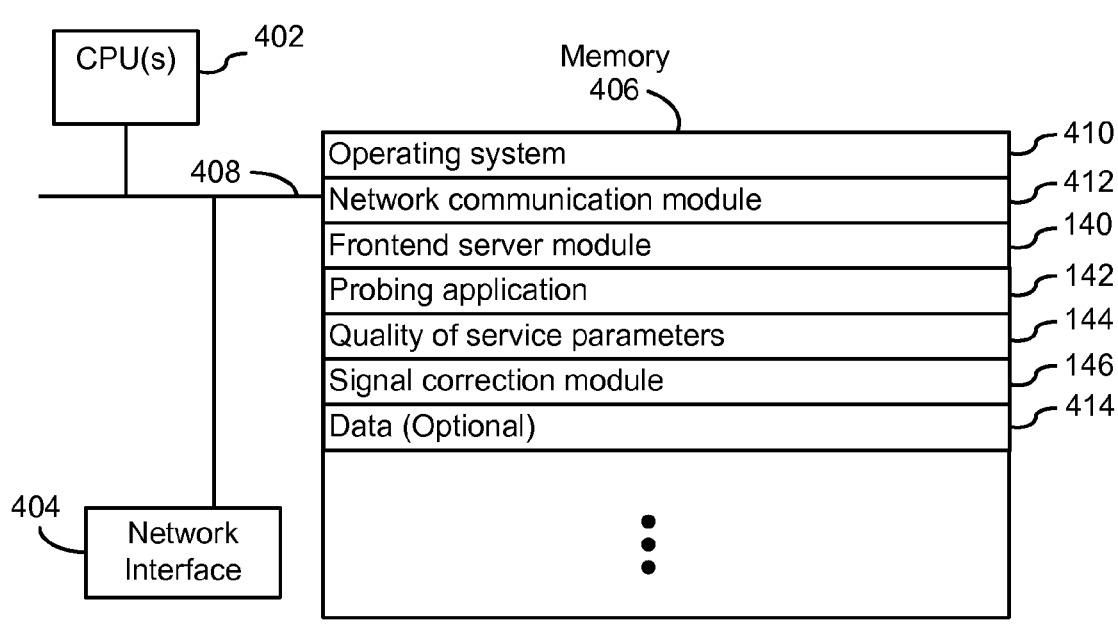
FIG. 4 is a block diagram illustrating a server system, in accordance with some embodiments.

FIG. 4 is a block diagram illustrating Probing server system 106 (also herein referred to as "Probing server 106"), in accordance with some embodiments. Probing server 106 typically includes one or more processing units CPU(s) 402 (also herein referred to as processors), one or more network or other Communications interfaces 404, Memory 406, and one or more Communication buses 408 for interconnecting these components. Communication buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

- Operating System 410 that includes procedures for handling various basic system services and for performing hardware dependent tasks;
- Network communication module (or instructions) 412 for connecting Probing server 106 with other devices (e.g., Clients 102, or other Probing servers 106) via Network interfaces 404 (wired or wireless) and one or more networks (e.g., Communication networks 104), such as the Internet, other wide area networks, local area networks, metropolitan area networks, VOIP network, PSTN network, and so on;
- Frontend server module 140 for sending test audio packets generated by Probing application 142, to one or more Clients 102 via Communication networks 104, receiving a response thereto, and transmitting signal correction action activated by Signal correction module 146 to networking components within Communication networks 104 (e.g., to High capacity jitter buffer 114), or to Clients 102;
- Probing application 142 for generating or sending test audio packets with various levels of signal complexities (e.g., constant or varying delays between data packets) in order to assess jitter buffers within Communication networks 104;
- Quality of service parameters 144 for including quality of service information, packet delay variation information, signal complexity information, jitter mitigation information, and information concerning High capacity jitter buffer 114;
- Signal correction module 146 for selectively activating signal correction signals, in response to a received response to test audio packets; and
- optionally, Data 414 for including cached data (e.g., test audio packet awaiting transmission, and responses to test audio packets).

In some implementations, one or more of the above identified elements are stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Probing Server System 106," FIG. 4 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a "Probing Server System 106" and how features are allocated among them will vary from one implementation to another, and optionally depends in part on the amount of data traffic that the system must handle during peak usage periods as well as during average usage periods.

Figure 5:
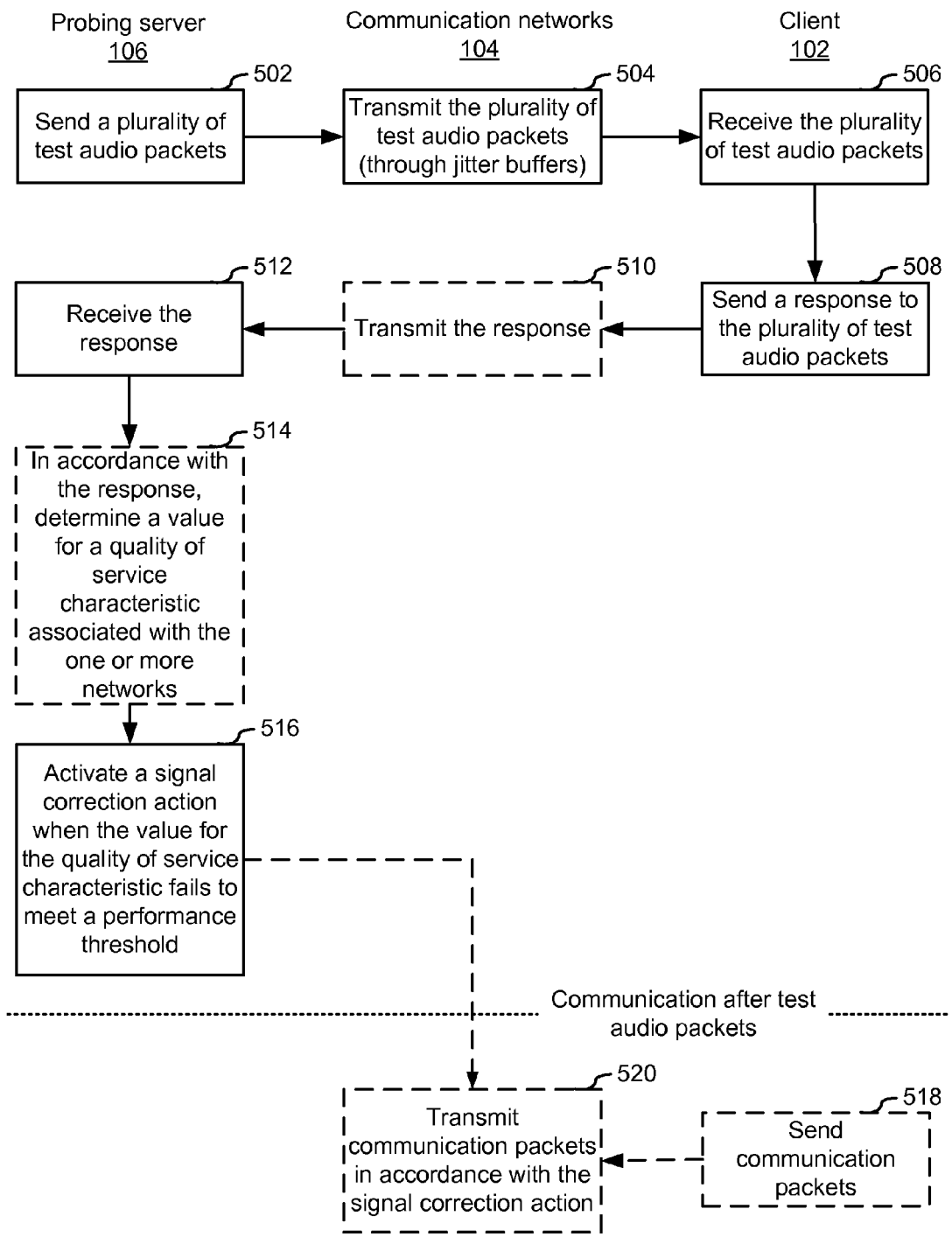
FIG. 5 includes a flow chart illustrating a method for discovering and assessing jitter buffers, in accordance with some embodiments.

FIG. 5 includes a flowchart illustrating a method for discovering and assessing jitter buffers, in accordance with some embodiments. Method 500 is, optionally, governed by instructions that are stored in a non-transitory computer readable storage medium and that are interpreted or executed by one or more processors of one or more servers (e.g., Probing server 106 in FIG. 4). Operations shown in FIG. 5 typically correspond to instructions stored in a computer memory or non-transitory computer readable storage medium (e.g., Memory 406 of Probing server 106 in FIG. 4). In some implementations, the non-transitory computer readable storage medium includes a magnetic or optical disk storage device, solid state storage devices such as Flash memory, or other non-volatile memory device or devices. In some implementations, the computer readable instructions stored on the non-transitory computer readable storage medium include one or more of: source code, assembly language code, object code, or other instruction format that is interpreted or executed by one or more processors. In various embodiments, some operations in method 500 may be combined and/or the order of some operations may be changed from the order shown in FIG. 5.

In some embodiments, to discover and assess jitter buffers among one or more networks through which users or devices are communicating, Probing server 106 sends (502) a plurality of test audio packets to one or more Clients 102 through the one or more networks. In some embodiments, the test audio packets are sent to Clients 102 before data packets representing user communication are sent, so that user communication is transmitted at a later time with signal correction actions, if desired, to maintain communication quality. In other embodiments, test audio packets are sent in parallel with data packets representing user communication, so that users can communicate without delay. In other embodiments, the test audio packets include at least a portion of user communication, such as one or more less important portions of user communication (e.g., courtesy greetings, and or "small talks"). In still other embodiments, the test audio packets are sent after at least a portion of user communication is sent, such as, when the user communication includes critical information that are to be delivered forthwith (e.g., without any kind of delay). In still other embodiments, test audio packets are sent by Probing server 106 on a recurring basis, e.g., once a week, once a day, once an hour, etc., in order to maintain optimal quality of service parameters using the systems and methods disclosed herein. In some embodiments, test audio packets are generated by Probing server 106 for a testing purpose, such as for discovering jitter buffers.

In some embodiments, the one or more networks, through which users communicate, include networks implemented in different networking protocols. For example, in some situations, Client 102-A (e.g., a computer) communicates with Client 102-B (e.g., a telephone) through Communication networks 104, which includes both VOIP network 110 and PSTN network 118.

In some embodiments, the test audio packets are sent to one Client 102, to, for example, conserve network bandwidth. In other embodiments, the test audio packets are sent to several (e.g., two or more) Clients 102, which are communicating with each other, to, for example, reduce response time, because, in many situations, jitter buffer capacity can be determined with one response from one of the several Clients 102 (e.g., the first response received by Probing Server 106). In some embodiments, different portions of the test audio packets are sent to different components of the one or more networks, and responses to these portions of test audio packets are later received and analyzed, in parallel or in series. For example, when the communication path between two Clients 102 exceeds a threshold length, Probing server 106 sends some portion of the test audio packets to a first portion of the communication path (e.g., the portion that includes VOIP network 108), and some other portions of the test audio packets to a second portion of the communication path (e.g., the portion that includes PSTN network 118) while bypassing the first portion of the communication path (e.g. bypassing the portion that includes VOIP network 108). This approach reduces response time from Clients 102, because jitter buffer capacities along different portions of the one or more network are discovered in parallel.

In some embodiments, the plurality of test audio packets is sent at a level of signal complexity deviating from a model level of signal complexity. In some embodiments, the model level of signal complexity includes a constant delay between test audio packets. Thus, in some implementations, delays between test audio data packets sent to Client(s) 102 are not constant (e.g., the delay between the first test audio pack and the second test audio pack is greater or smaller than that between the third and the fourth test audio packets, and so forth). In some embodiments, a delay is a threshold period time having a duration selected from the range of 100 milliseconds to 1000 milliseconds. In some embodiments, a delay is a threshold period time having a duration selected from the range of 1 second to 10 seconds. In some embodiments, a delay is a threshold period time having a duration selected from the range of 5 seconds to 40 seconds. In some embodiments, a delay is 10, 20, 30, 40, 50, 60, 70, or 80 milliseconds, or greater than 1 second.

In some embodiments, sending the plurality of test audio packets at a level of signal complexity deviating from a model level of signal complexity includes sending the plurality of test audio packets in a plurality of packet trains—several data packets received or sent within a predefined time interval—with variations in delay between packet trains. In some embodiments, a packet train includes several data packets sent or received without a predefined time interval (e.g., at or around the same time, or within 10 milliseconds of each other). In other words, in some implementations, the plurality of test audio packets is partitioned into several portions (e.g., several packets trains), which are then sent to Client(s) 102 or components of Communication networks 104 with various delays therebetween. For example, the delay between the first and second packet train is 5 milliseconds, while the delay between the second and third packet train is 2 milliseconds, and so forth. In some embodiments, the variation in delay between packet trains includes a progressively increasing delay between packet trains. In other words, in some implementations, delays between packet trains increase with time; the delay between packet trains sent or received at an earlier time is smaller than that between packet trains sent or received at a later time.

In other embodiments, the plurality of test audio packets is sent as individual packets. In some embodiments, sending a plurality of test audio packets at a level of signal complexity deviating from a model level of signal complexity includes sending the plurality of test audio packets with packet delay variations. In other words, like packet trains, individual packets are, in some implementations, also sent with various delays therebetween. For example, the delay between the first packet and the second packet is 5 milliseconds, while the delay between the second and third packets is 3 milliseconds, and so forth. In some embodiments, the packet delay variation is randomly or pseudo-randomly generated. In other words, in some implementations, the delays between individual data packets are generated randomly (e.g., a random number or integer generated by a random number generator) or pseudo-randomly.

In still other embodiments, the plurality of test audio packets includes both individual data packets and packet trains, which are then sent with constant or various delays. These approaches—sending individual packets or packet trains with various delays—can test jitter buffers' behaviors from different perspectives, thereby producing more comprehensive and accurate results.

In some embodiments, the plurality of test audio packets sent by Probing server 106 is transmitted (504) via Communication networks 104 to Client(s) 102. After receiving (506) the plurality of test audio packets, a Client 102 sends (508) a response to the plurality of test audio packets. In some embodiments, the response is transmitted (510) via Communication networks 104 back to Probing Server 106. In other embodiments, the response is transmitted back to Probing Server 106, without going through Communication networks 104 (e.g., bypassing Communication networks 104). In some embodiments, where Probing server 106 resides on Client 102 (e.g., a thick client), the response is sent back to Client 102.

In some embodiments, after receiving (512) the response to the plurality of test audio packets, Probing server 106 determines (514) a value of a quality of service characteristic associated with Communication networks 104, in accordance with the response. In some embodiments, the value for the quality of service characteristic associated with the one or more networks is determined by a jitter mitigation capability of the one or more networks based on the response to the plurality of test audio packets. In some embodiments, the quality of service characteristic includes an amount of test audio packets delay (also called jitter) between Clients 102.

In some embodiments, the quality of service characteristic associated with the one or more networks is determined by Client(s) 102. Thus, in some embodiments, the response (received by Probing server 106) includes a value for a quality of service characteristic associated with the one or more networks, and the value is determined by a jitter mitigation capability of the one or more networks for handling how the plurality of test audio packets deviate from the model level of signal complexity when received by the remote device. In some embodiments, determining how the plurality of test audio packets deviates from the model level of signal complexity when received by the remote device includes calculating a deviation or difference in arrival times of the plurality of test audio packets and the model level of signal complexity using any of a number of statistical methods known in the art and/or control theory on the received side (e.g., Proving server 106) to filter noise. In some embodiments, determining how the plurality of test audio packets deviates from the model level of signal complexity when received by the remote device includes calculating an amount (e.g., a deviation amount) by which the plurality of test audio packets deviates from the model level of signal complexity when received by the remote device. In other words, in some implementations, the response to test audio packets includes information concerning jitter buffer capacity (e.g., total capacity of jitter buffers available to the communication between Client 102-A and Client 102-B, or total capacity of jitter buffers available to the communication between Probing Server 106 and Client 102-B) within the networks, and the jitter buffer capacity is determined from the transmission of test audio packets from one Client 102 or the Probing server 106 to another Client 102. In some embodiments, the determination of the jitter mitigation capability of the one or more networks includes determining a jitter buffer capability (e.g., a type of jitter buffer: constant, adoptive, etc.) and a maximum delay of the jitter buffer associated with the one or more networks. In some embodiments, a delay is a threshold period time having a duration selected from the range of 100 milliseconds to 1000 milliseconds. In some embodiments, a delay is a threshold period time having a duration selected from the range of 1 second to 10 seconds. In some embodiments, a delay is a threshold period time having a duration selected from the range of 5 seconds to 40 seconds. In some embodiments, a delay is 10, 20, 30, 40, 50, 60, 70, or 80 milliseconds, or greater than 1 second. Discovering the jitter buffer capacity and the maximum delay of the jitter buffers is important, because such information can determine whether to activate signal correction actions (e.g., activating High capacity jitter buffer 114), which improve communication quality (e.g., by providing more data buffer capacity).

In some implementations, the jitter mitigation capacity associated with the one or more networks includes jitter buffer capacity associated with the networks, and a maximum amount of delay of communication data between Clients 102, which was caused by jitter buffer within the networks.

In some embodiments, the determination of the jitter mitigation capability of the one or more networks includes determining an adaptive jitter buffer capability associated with the one or more networks, a constant jitter buffer capability associated with the one or more networks, a dumb jitter buffer capability associated with the one or more networks, or a smart jitter buffer capability associated with the one or more networks. In other words, the determination of the jitter mitigation capability of the one or more networks, in some implementations, includes identifying a type of a jitter buffer in the networks. In some embodiments, the determination of the jitter mitigation capability also includes discovering jitter buffer configurations, such as maximum delay associated with a jitter buffer, and comparing jitter buffer behaviors with intended behaviors of a super jitter buffer (e.g., High capacity jitter buffer 114), so as to avoid jitter overflow or underflow.

In some embodiments, an adaptive jitter buffer includes a jitter buffer with a varying or adoptive size. In some implementations, an adaptive jitter buffer expands in size when jitter increases and contracts when jitter decreases. As such, in some embodiments, an adaptive jitter buffer outputs incoming data with various delays. For example, delay associated with output data increases as the size of the jitter buffer increases.

In some embodiments, a constant jitter buffer includes a jitter buffer that outputs incoming data with a constant delay. In some embodiments, the constant delay is an amount of time a data packet is withheld in the jitter buffer (e.g., awaiting arrival of related packets) before it is eventually outputted.

In some embodiments, a dumb jitter buffer includes a jitter buffer that does not alter incoming data (data packets or packet trains), except for dropping data that arrived when the jitter buffer is full. In other words, data outputted by a dumb jitter buffer is identical to that received by the dumb jitter buffer, except for the absence of dropped data. In some embodiments, in an underflow situation, a dumb jitter buffer outputs "dummy" data, for example, all zeros, comfort noise, or the like, when "real" data is being withheld in the jitter buffer—awaiting further transmission together with other data that has not yet arrived at the jitter buffer.

In some embodiments, a smart jitter buffer includes a jitter buffer with a varying size depending on network conditions. The size of a smart jitter buffer, in some embodiments, enlarges or contracts. In an overflow situation, when the size of an adaptive jitter buffer is contracting, communication data stored in the adoptive jitter buffer is outputted at a higher speed than normal (e.g., the communication is "sped up."). In some situations, during "sped up" output, one or more portions of the communication data are dropped, when other portions are outputted at normal speed. In some implementations, the one or more dropped portions include less important portions of the user communication, such as filler phrases (e.g., "er," "um" or the like), as well as pauses. In other embodiments, during instance where output is sped-up, communication data stored in jitter buffer is outputted using a pitch-preserving algorithm, so that the communication is delivered in a time interval less than its normal length. In some embodiments, in an underflow situation, a smart jitter buffer outputs (1) "smart" data, such as repeating an important portion of an earlier communication to highlight its importance, rather than "dummy" data, or (2) a stretched version of the communication (e.g., playing out an audio more slowly, using a pitch-preserving algorithm).

In some embodiments, after receiving the response to the plurality of test audio packets, Probing server 106 activates (516) a signal correction action when the value for the quality of service characteristic fails to meet a performance threshold. In some embodiments, activating the signal correction action includes activating a high-capacity jitter buffer within the one or more networks (e.g., High capacity jitter buffer 114 within Communication networks 104, FIG. 1). In some embodiments, activating the high capacity jitter buffer includes routing at least a portion of the communication data between two Clients 102 through the high capacity jitter buffer (e.g., placing data in high capacity jitter buffer for scheduled output). In other embodiments, activating the signal correction action includes one selected from the group consisting of: changing a play-out buffer size (e.g., changing the size of Buffer queue 214, FIG. 2), changing a codec (e.g., Encoding and/or Decoding 212, FIG. 2), applying an error correction, removing an error correction, enabling voice activity detection, and disabling voice activity detection. In some embodiments, signal correction actions are activated at least in part based on the content of user communication, such as words, phrases, and sentences therein. In some embodiments, activating a signal correction action includes applying the signal correction action to some but not all portions of the user communication. For example, a change of codec (e.g., from a more secure but slower codec to a less secure but faster codec), in some embodiments, is activated to apply to less sensitive portions of the user communication, but not to the portions that are considered sensitive or confidential.

In some embodiments, activating the signal correction action includes activating a signal correction action in accordance with statistical data concerning past or ongoing user communications such as, for example, routing information of previous phone calls between Clients 102 and/or that between other similarly situated Clients 102 (other Clients 102 with IP address in the same geographical region as the Clients 102) or information regarding signal correction action previously taken between Clients 102 and/or other similarly situated Clients 102. In some embodiments, activating a signal correction action in accordance with statistical data concerning past or ongoing user communications further includes aggregating the statistical data concerning past or ongoing user communication (e.g., online or offline, e.g., during or after the user communication), and performing a statistical analysis of the aggregated statistical data in order to determine an optimal signal correction action (also called signal correction action fine-tuning) In some embodiments, the statistical data is aggregated or collected on a recurring basis (e.g., periodically), for example, every five or ten seconds, or every ten or twenty minutes during a communication between Clients 102.

In some embodiments, activating a signal correction action when the value for the quality of service characteristic fails to meet a performance threshold includes activating the signal when the aggregated statistical data has met a set of threshold data-gathering criteria. For example, a signal correction is not activated when the aggregated statistical data includes data concerning two or less communications (e.g., prior and/or ongoing communications) between Clients 102, and the signal correction action is activated when the aggregated statistical data includes data concerning more than five communications (e.g., prior and/or ongoing communications) between Clients 102. In some embodiments, the signal correction action is not activated until after there have been at least ten communications (e.g., prior and/or ongoing communications) between Clients 102.

In some embodiments, after the signal correction action has been activated, Client 102 sends (518) one or more communication packets (data packets representing user communication) via Communications networks 104. The one or more communication packets are transmitted (520) in Communications networks 104 in accordance with the signal correction action previously activated. In some embodiments, test audio packets are sent for purpose of discovering and/or assessing jitter buffers within Communication network 104, so as to determine whether any corrective actions are to be taken in order to eliminate or reduce jitter within communications via Communications network 104. This approach makes jitter mitigation capacity associated with the networks available to a service provider so that corrective measures can be taken to enhance communication quality.

It should be understood that the particular order in which the operations in FIG. 5 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 600 (described herein with reference to FIG. 6) are also applicable in an analogous manner to method 500 described above with respect to FIG. 5. For example, the plurality of test audio packets, and the response thereto, the quality service characteristic, and the signal correction action described above with reference to method 500 may have one or more of the characteristics of the plurality of test audio packets, and the response thereto, the quality service characteristic, and the signal correction action described herein with reference to method 600. For brevity, these details are not repeated here.

Figure 6:
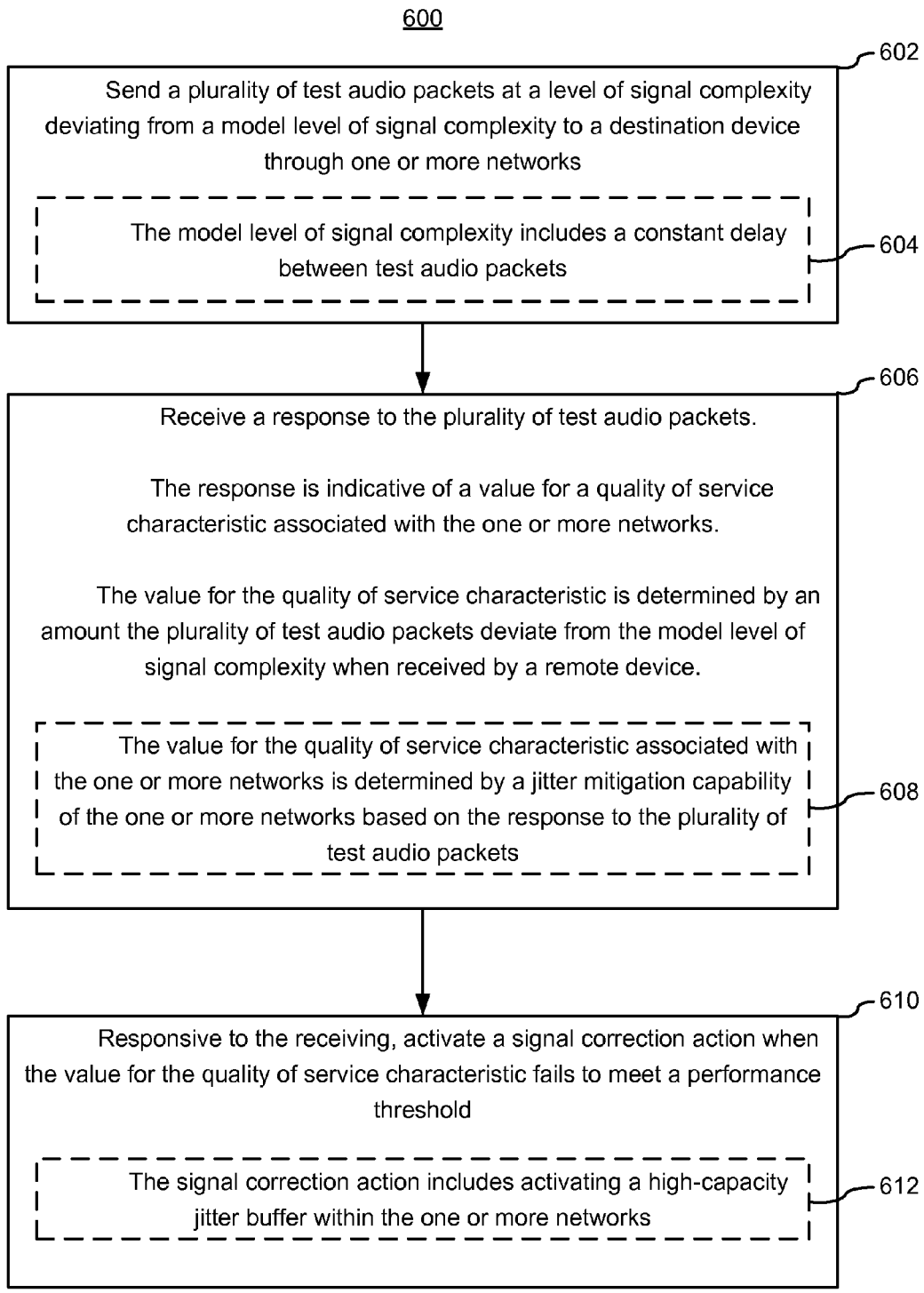
FIG. 6 is a flow diagram illustrating a method of discovering and assessing jitter buffers, at a server system, in accordance with some embodiments.

FIG. 6 includes a flowchart representing a method for discovering and assessing jitter buffers, at a server system, in accordance with some embodiments. Method 600 is, optionally, governed by instructions that are stored in a non-transitory computer readable storage medium and that are executed by one or more processors of one or more servers (e.g., Probing server 106 in FIG. 4). In some implementations, each of the operations shown in FIG. 6 corresponds to instructions stored in a computer memory or non-transitory computer readable storage medium (e.g., Memory 406 of Probing server 106 in FIG. 4). In some implementations, the non-transitory computer readable storage medium includes a magnetic or optical disk storage device, solid state storage devices such as Flash memory, or other non-volatile memory device or devices. In some implementations, the computer readable instructions stored on the non-transitory computer readable storage medium include one or more of: source code, assembly language code, object code, or other instruction format that is interpreted or executed by one or more processors. In various embodiments, some operations in method 600 may be combined and/or the order of some operations may be changed from the order shown in FIG. 6.

In some embodiments, Probing Server 106 first sends (602) a plurality of test audio packets at a level of signal complexity deviating from a model level of signal complexity to a destination device through one or more networks. In some embodiments, the model level of signal complexity includes (604) a constant delay between test audio packets. Also, in some embodiments, sending a plurality of test audio packets at a level of signal complexity deviating from a model level of signal complexity includes sending the plurality of test audio packets in a plurality of packet trains with variation in delay between packet trains.

After sending the plurality of test audio packets, Probing Server 106 receives (606) a response to the plurality of test audio packets. In some implementations, the response is indicative of a value for a quality of service characteristic associated with the one or more networks, and the value for the quality of service characteristic is determined by how the plurality of test audio packets deviate from the model level of signal complexity when received by a remote device. In some embodiments, determining how the plurality of test audio packets deviates from the model level of signal complexity when received by the remote device includes calculating a deviation or difference between arrival times of the plurality of test audio packets and the model level of signal complexity using any of a number of statistical methods and/or control theory on the received side (e.g., Probing server 106) to filter noise. In some embodiments, determining how the plurality of test audio packets deviates from the model level of signal complexity when received by the remote device includes calculating an amount (e.g., a deviation amount) by which the plurality of test audio packets deviate from the model level of signal complexity when received by the remote device. In some embodiments, the value for the quality of service characteristic associated with the one or more networks is determined (608) by a jitter mitigation capability of the one or more networks based on the response to the plurality of test audio packets.

In response to receiving the response to test audio packets, Probing server 106 activates (610) a signal correction action when the value for the quality of service characteristic fails to meet a performance threshold. As discussed above, in some embodiments, activating the signal correction action includes (612) activating a high-capacity jitter buffer within the one or more networks (e.g., activating High capacity jitter buffer 114 in Communications networks 104, FIG. 1). In some embodiments, High-capacity jitter buffer 114 is activated between VOIP network 110 and PSTN network 118. In other embodiments, High-capacity jitter buffer 114 is activated between Client 102 and VOIP network 110. In some embodiments, High-capacity jitter buffer 114 is activated on Client 102 (implemented in software or hardware). In still other embodiments, High-capacity jitter buffer 114 is activated at one or more locations, within or without Communication networks 104. In some embodiments, High-capacity jitter buffer 114 includes a server that manages a high capacity jitter buffer, such as a NetEQ. In other embodiments, activating the signal correction action includes one selected from the group consisting of: changing a play-out buffer size, changing a codec, applying an error correction, removing an error correction, enabling voice activity detection, and disabling voice activity detection.

It should be understood that the particular order in which the operations in FIG. 6 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600 (described herein with reference to FIG. 6) are also applicable in an analogous manner to method 500 described above with respect to FIG. 5. For example, the plurality of test audio packets, and the response thereto, the quality service characteristic, and the signal correction action described above with reference to method 600 may have one or more of the characteristics of the plurality of test audio packets, and the response thereto, the quality service characteristic, and the signal correction action described herein with reference to method 500. For brevity, these details are not repeated here.

Figure 7A:
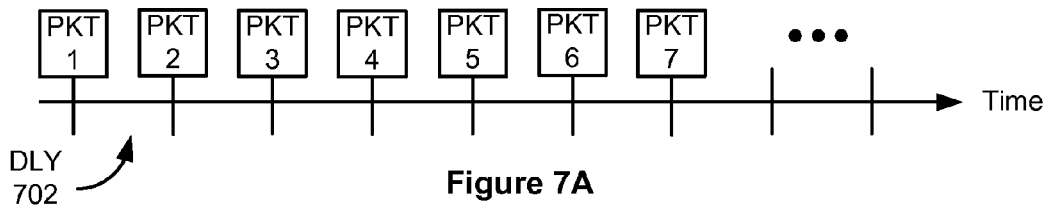
FIG. 7A is a block diagram illustrating an example of discovering and assessing jitter buffers, in accordance with some embodiments.

FIG. 7A illustrates an example of discovering jitter buffers, in accordance with some embodiments. As shown in FIG. 7A, test audio packets (e.g., PKTs 1-7) are sent with constant delays (DLY 702) between these packets. In some embodiments, sending test audio packets with constant delay is also called sending audio test packets with a model level of signal complexity. Because in some situations, data packets arrive at a jitter buffer with constant delays, this approach is beneficial because it reveals jitter buffer behaviors under "normal" circumstances.

Figure 7B:
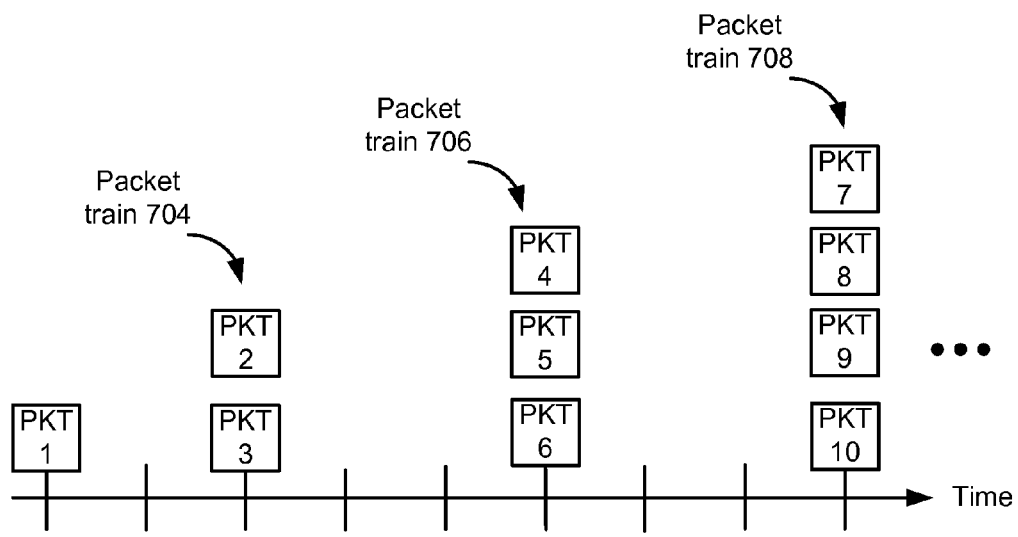
FIG. 7B is a block diagram illustrating a second example of discovering and assessing jitter buffers, in accordance with some embodiments.

FIG. 7B is a block diagram illustrating a second example of discovering jitter buffers, in accordance with some embodiments. As shown in FIG. 7B, test audio packets include several packet trains—Packet train 704, Packet train 706, and Packet train 708. As shown, the several packet trains are of various sizes. In some embodiments, the size of packet trains increases progressively with time. For example the size of Packet train 708 is greater than the size of Packet train 706, which is in turn greater than that of Packet train 704. This approach allows incremental probing of maximum jitter mitigation capacity. In other embodiments, the sizes of packet trains progressively decrease. In still other embodiments, the sizes of packet trains are independent of time. In other words, the sizes of packet trains fluctuate (e.g., do not always progressively increase or decrease, e.g., on a random on pseudo-random basis). Sending packet trains with various sizes can detect the existence and behaviors of constant jitter buffers, as well as those of adaptive jitter buffers, the size of which expands or contracts, depending on incoming data packets. For example, for an adaptive jitter buffer capable of buffering three data packets at the same time, in some situations, the size of the adaptive jitter buffer remains constant (e.g., neither expands nor contracts) at the arrivals of Packet train 704 or Packet train 706. To accommodate the arrival of Packet train 708, however, the adaptive jitter buffer expands in size, which in some situations introduces more jitter into user communication. Sending packet trains with various delays reveals information concerning delays introduced by adaptive jitter buffer, due at least in part on its expansion or contraction in size.

Also shown in FIG. 7B, packet trains are also sent with various delays therebetween, which simulates a communication including fluctuating jitters. For instance, in some embodiments, the delay between Packet train 704 and Packet train 706 is smaller than that between Packet train 706 and Packet train 708. In some embodiments, data packets that arrive within a predefined threshold time interval are always outputted together. When the delay between packet trains exceeds the maximum size of a jitter buffer, however, the packet trains are outputted in different batches (e.g., not outputted together). In some implementations, based on whether two packet trains are outputted in the same batch or in different batches, the maximum jitter buffer capacity is determined. Sending packet trains with various delays, in many situations, also reveals the existence of a dumb jitter buffer or a smart jitter buffer. In many situations, a jitter buffer underflow occurs, when only a small amount of data is received at a jitter buffer. Based on what data is outputted in the event of the underflow, "smart" data or "dummy" data, Probing server 106 can determine whether a jitter buffer includes a smart jitter buffer or a dumb jitter buffer.

Figure 7C:
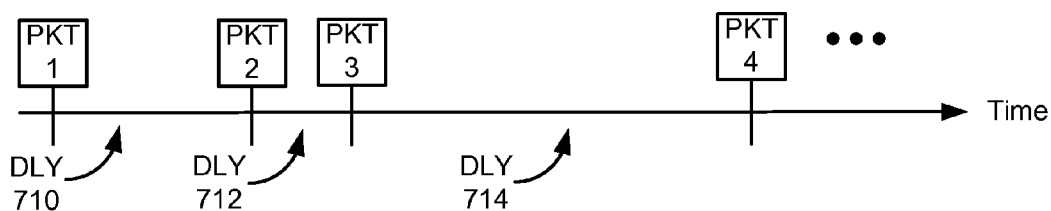
FIG. 7C is a block diagram illustrating a third example of discovering and assessing jitter buffers, in accordance with some embodiments.

FIG. 7C is a block diagram illustrating a third example of discovering jitter buffers, in accordance with some embodiments. In this example, test audio packets are sent as individual packets, with various delays. As shown in FIG. 7C, the delay (DLY 710) between PKT 1 and PKT 2 is greater than the delay (DLY 712) between PKT 2 and PKT 3. Also, the delay (DLY 714) between PKT 3 and PKT 4 is greater than both DLY 710 and DLY 712. As discussed above, sending data packets with various delays simulates a communication including fluctuating jitters. The behaviors of the one or more network, especially the associated jitter mitigation capacity can then be discovered.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   at a device comprising one or more processors and a memory storing one or more programs for execution by the one or more processors:
      sending a plurality of test audio packets at a level of signal complexity deviating from a model level of signal complexity to a destination device through one or more networks, wherein a first time interval between when a first and second test audio packet, in a first pair of consecutively sent test audio packets in the plurality of test audio packets, is sent differs from a second time interval between when a third and fourth test audio packet, in a second pair of consecutively sent test audio packets in the plurality of test audio packets, is sent;
      receiving a response to the plurality of test audio packets, wherein the response is indicative of a value for a quality of service characteristic associated with the one or more networks, wherein the value for the quality of service characteristic is determined by how the plurality of test audio packets deviate from the model level of signal complexity when received by a remote device; and
      responsive to receiving the response to the plurality of test audio packets,
         activating a signal correction action when the value for the quality of service characteristic fails to meet a performance threshold.

2. The method of claim 1, wherein sending a plurality of test audio packets at a level of signal complexity deviating from a model level of signal complexity includes:
   sending the plurality of test audio packets in a plurality of packet trains with variation in delay between packet trains and constant delay between packets within packet trains.

3. The method of claim 2, wherein the variation in delay between packet trains includes: a progressively increasing delay between packet trains.

4. The method of claim 1, wherein sending a plurality of test audio packets at a level of signal complexity deviating from a model level of signal complexity includes:
   sending the plurality of test audio packets with packet delay variation.

5. The method of claim 4, wherein the packet delay variation is randomly or pseudo-randomly generated.

6. The method of claim 1, wherein activating the signal correction action includes:
   activating a high-capacity jitter buffer within the one or more networks.

7. The method of claim 1, wherein the value for the quality of service characteristic associated with the one or more networks is determined by a jitter mitigation capability of the one or more networks based on the response to the plurality of test audio packets.

8. The method of claim 7, wherein the determination of the jitter mitigation capability of the one or more networks includes:
   determining a jitter buffer capability and a maximum delay of the jitter buffer associated with the one or more networks.

9. The method of claim 7, wherein the determination of the jitter mitigation capability of the one or more networks includes:
   determining an adaptive jitter buffer capability associated with the one or more networks, a constant jitter buffer capability associated with the one or more networks, a dumb jitter buffer capability associated with the one or more networks, or a smart jitter buffer capability associated with the one or more networks.

10. The method of claim 1, wherein the response includes the value for the quality of service characteristic associated with the one or more networks, and wherein the value is determined by a jitter mitigation capability of the one or more networks for handling how the plurality of test audio packets deviate from the model level of signal complexity when received by the remote device.

11. The method of claim 1, wherein activating the signal correction action includes one selected from the group consisting of: changing a play-out buffer size, changing a codec, applying an error correction, removing an error correction, enabling voice activity detection, and disabling voice activity detection.

12. A system, comprising:
   one or more processors;
   a memory; and
   one or more programs, wherein the one or more programs are stored in the memory and configured to be executed by the one or more processors, the one or more programs including instructions for:
      sending a plurality of test audio packets at a level of signal complexity deviating from a model level of signal complexity to a destination device through one or more networks, wherein a first time interval between when a first and second test audio packet, in a first pair of consecutively sent test audio packets in the plurality of test audio packets, is sent differs from a second time interval between when a third and fourth test audio packet, in a second pair of consecutively sent test audio packets in the plurality of test audio packets, is sent;

receiving a response to the plurality of test audio packets, wherein the response is indicative of a value for a quality of service characteristic associated with the one or more networks, wherein the value for the quality of service characteristic is determined by how the plurality of test audio packets deviate from the model level of signal complexity when received by a remote device; and responsive to receiving the response to the plurality of test audio packets,
  activating a signal correction action when the value for the quality of service characteristic fails to meet a performance threshold.

13. The system of claim 12, wherein sending a plurality of test audio packets at a level of signal complexity deviating from a model level of signal complexity includes: sending the plurality of test audio packets in a plurality of packet trains with variation in delay between packet trains and constant delay between packets within packet trains.

14. The system of claim 13, wherein the variation in delay between packet trains includes: a progressively increasing delay between packet trains.

15. The system of claim 12, wherein activating the signal correction action includes: activating a high-capacity jitter buffer within the one or more networks.

16. A non-transitory computer readable storage medium storing one or more programs, the one or more programs comprising instructions, which when executed by a computer system with one or more processors, cause the computer system to:

send a plurality of test audio packets at a level of signal complexity deviating from a model level of signal complexity to a destination device through one or more networks, wherein a first time interval between when a first and second test audio packet, in a first pair of consecutively sent test audio packets in the plurality of test audio packets, is sent differs from a second time interval between when a third and fourth test audio packet, in a second pair of consecutively sent test audio packets in the plurality of test audio packets, is sent;

receive a response to the plurality of test audio packets, wherein the response is indicative of a value for a quality of service characteristic associated with the one or more networks, wherein the value for the quality of service characteristic is determined by how the plurality of test audio packets deviate from the model level of signal complexity when received by a remote device; and in response to receiving the response of the plurality of test audio packets,
  activate a signal correction action when the value for the quality of service characteristic fails to meet a performance threshold.

17. The non-transitory computer readable storage medium of claim 16, wherein sending a plurality of test audio packets at a level of signal complexity deviating from a model level of signal complexity includes: sending the plurality of test audio packets in a plurality of packet trains with variation in delay between packet trains and constant delay within packet trains.

18. The non-transitory computer readable storage medium of claim 17, wherein the variation in delay between packet trains includes: a progressively increasing delay between packet trains.

19. The non-transitory computer readable storage medium of claim 16, wherein activating the signal correction action includes: activating a high-capacity jitter buffer within the one or more networks.

* * * * *